Jan. 16, 1940.    W. VAN E. THOMPSON    2,187,549
FLUID OPERATED MOTOR REVERSING MECHANISM
Filed Sept. 22, 1936    3 Sheets-Sheet 1

INVENTOR
WALTER VAN E. THOMPSON
BY
Ford W. Harris
ATTORNEY.

Jan. 16, 1940.        W. VAN E. THOMPSON        2,187,549
FLUID OPERATED MOTOR REVERSING MECHANISM
Filed Sept. 22, 1936        3 Sheets-Sheet 2
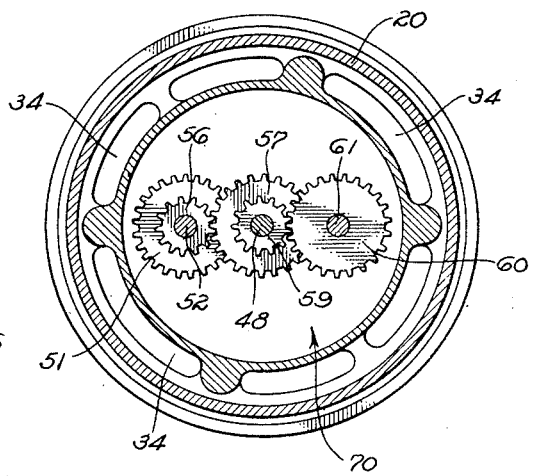
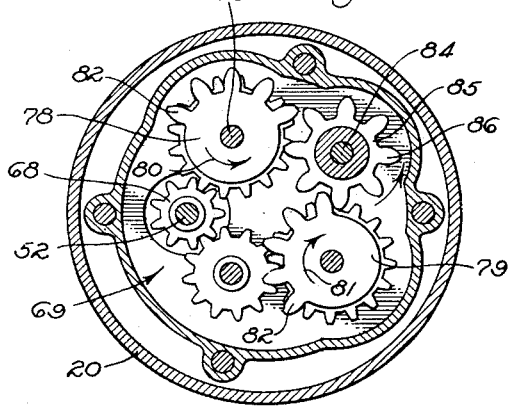
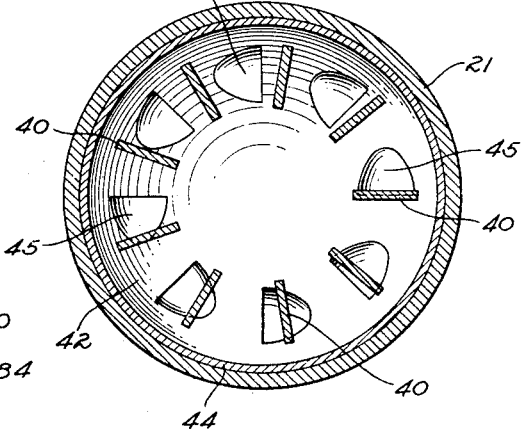
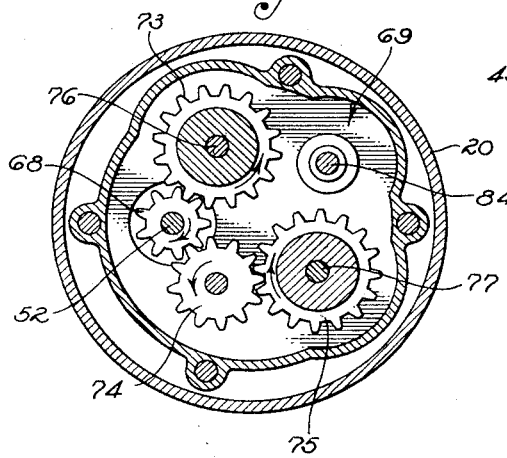
INVENTOR
WALTER VAN E. THOMPSON
BY
ATTORNEY.

Jan. 16, 1940. W. VAN E. THOMPSON 2,187,549
FLUID OPERATED MOTOR REVERSING MECHANISM
Filed Sept. 22, 1936 3 Sheets-Sheet 3
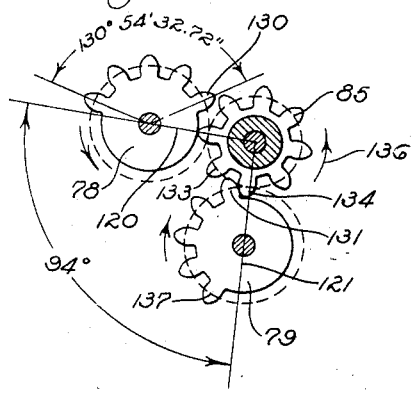
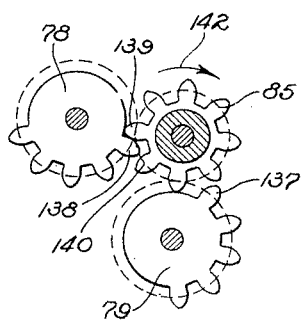
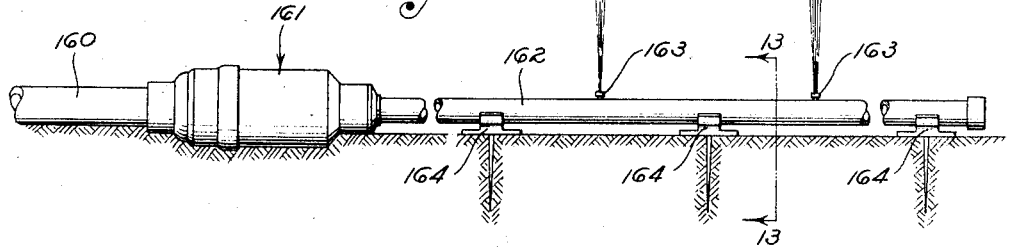
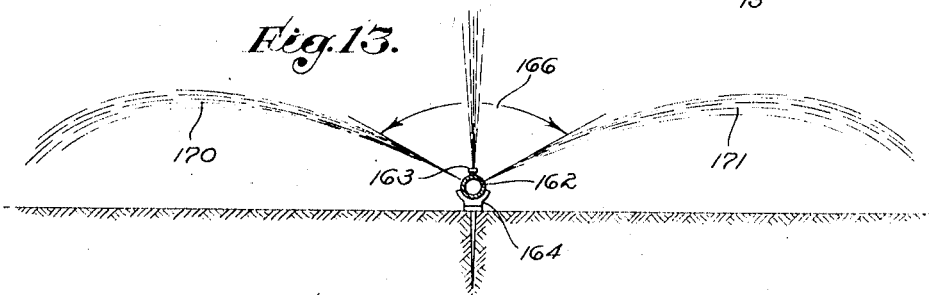
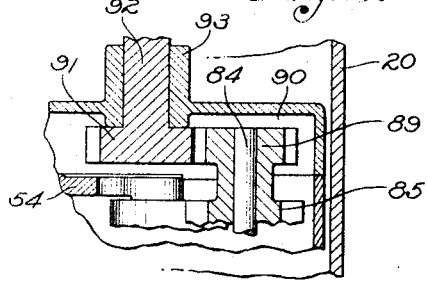
INVENTOR
WALTER VAN E. THOMPSON
BY
Ford W. Harris
ATTORNEY.

Patented Jan. 16, 1940

2,187,549

UNITED STATES PATENT OFFICE 2,187,549

FLUID OPERATED MOTOR REVERSING MECHANISM

Walter Van E. Thompson, Los Angeles, Calif., assignor to Thompson Manufacturing Company, Los Angeles, Calif., a corporation of California Application September 22, 1936, Serial No. 101,966

4 Claims. (Cl. 299—67)

My invention relates to a fluid operated, motion reversing mechanism particularly designed for use in the art of irrigation, and in view of its especial applicability to that art, I shall describe my invention in connection therewith.

I believe my invention to be broadly new not only in its entirety, but also in the several sub-combinations and parts which comprise the whole. My invention is furthermore susceptible of embodiment in various mechanical reflexes, and I therefore do not wish to be limited to the precise details of construction which comprise the preferred forms of my invention and which I have chosen to describe and illustrate herein solely for the purpose of instructing those skilled in the art as to how my invention may be practiced.

In order that the objects, features, and advantages of my invention may be better understood, I will briefly refer to the art of irrigation wherein it is common practice to irrigate large areas, such, for example, as lawns by use of sprinklers which throw a long stream of water over the area to be irrigated. Rotary sprinklers are in common use today in which the sprinkler nozzle is slowly rotated through a full circle. Full circle sprinklers, however, cannot be employed in corners or along boundaries of an area, since the water must be confined within the limits of the area irrigated. However, to my knowledge, a satisfactory slowly movable half-circle or part-circle sprinkler capable of throwing a long stream of water is not available, and it was prior to my present invention common practice to employ small half-circle or quarter-circle sprinklers along the boundaries or in corner areas or to irrigate the portions by hand.

It is an object of my invention to provide a part-circle sprinkler in which the nozzle of the sprinkler is slowly rotated back and forth through a predetermined arc of the circle. In my invention the sprinkler nozzle may be moved through an arc consisting of one-half, one-fourth, or three-fourths of a circle or any other portion thereof as desired.

It is a further object of my invention to provide a sprinkler of this character in which the sprinkler nozzle may be slowly moved through its arc of travel and in which it is positively driven and is therefore positive in its operation.

It is another object of my invention to provide a sprinkler of the character described in which the nozzle is operated by a fluid operated, motion reversing mechanism, and in which the fluid employed for operating the mechanism, after it has operated the mechanism, passes through the sprinkler and is distributed over the area to be irrigated.

It is also common in the art of irrigation to irrigate hillsides, for example, by the use of a long pipe which is placed on the surface of the ground and which has either openings formed in it at spaced distances or has small nozzles screwed along the length of the pipe. These openings or nozzles throw a stream of water, and in order to irrigate on each side of this pipe it is manually rotated from one position which throws the water to one side of the pipe into another position which throws the water to the opposite side.

It is an object of my invention to provide an irrigation system of this character in which an irrigation pipe is automatically rotated back and forth so that it is unnecessary for an attendant to do this work.

It is a still further object of my invention to provide an irrigation system of this character including a fluid operated, motion reversing means which is associated with the irrigation pipe and which gradually rotates the pipe in one direction and then rotates it in the other direction, thus directing the streams of water first on one side of the pipe and then on the other side of the pipe, thus giving a uniform amount of water to the adjacent area.

In the production of the inventions pointed out heretofore, I have invented and have incorporated in such apparatus a unique motion reversing means which is preferably placed between the fluid actuated unit operating means and the driven means, which driven means consists either of the sprinkler nozzle or sprinkler unit or the sprinkler pipe referred to heretofore. In my invention the fluid actuated operating means is set into operation by the water flowing to the sprinkler nozzle or sprinkler pipe, and the fluid actuated operating means in turn operates the motion reversing means which in turn operates the driven means.

It is an object of my invention therefore to provide a fluid operating, motion reversing mechanism having the features and advantages set forth herein.

It is another object of my invention to provide a unique motion reversing mechanism which is non-locking, non-stalling, and foolproof so that when once installed it cannot get out of order and is not subject to tampering.

It is a further object of my invention to provide a motion reversing mechanism in which the parts are always locked from disalignment from operating position even at the end of the reciprocatory arc through which the driven member passes so that it is impossible for the parts to become misaligned so that the apparatus will be rendered inoperative.

It is an object of my invention to provide a motion reversing mechanism which consists of a pair of gear sectors which are rotated in opposite directions and which are adapted to consecutively drive a reversing gear in opposite directions and in which the parts are so arranged that as the last tooth of one of the sectors leaves the motion reversing gear the first tooth of the other sector moves into a position in cooperation with the driven gear so that the driven gear cannot become misaligned with either of the sectors and thus become inoperative or stalled.

It is still another object of the invention to provide a motion reversing mechanism in which the amount of motion in either direction may be either lengthened or shortened as desired.

I shall now describe two forms in which my invention may be embodied, it being understood that I have chosen these forms of my invention solely for the purpose of illustration and I do not wish to be limited thereto. In the course of my invention additional objects and advantages will be brought out.

Referring to the drawings.

Figure 1:
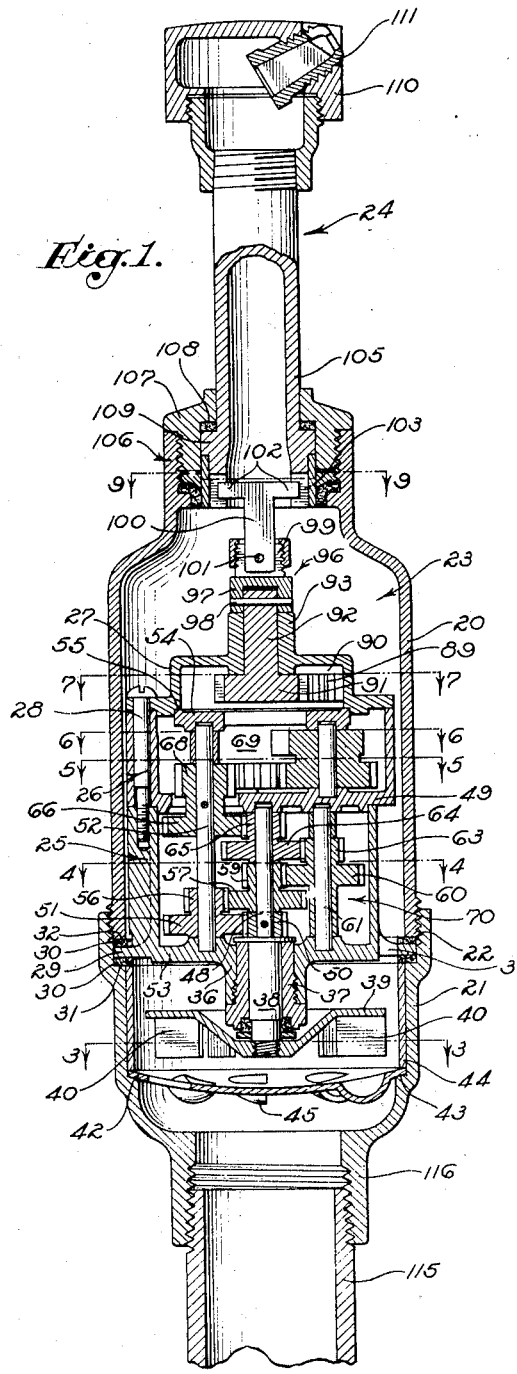
Fig. 1 is a vertical sectional view through a sprinkler incorporating the features of my invention.

Figs. 3, 4, 5, 6, and 7 are sectional views taken as indicated by the lines 3—3, 4—4, 5—5, 6—6, and 7—7 of Fig. 1.

Figure 7:
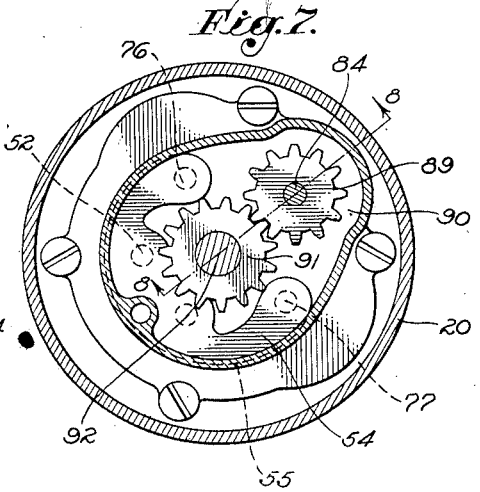

Fig. 8 is a fragmentary sectional view taken on the line 8—8 of Fig. 7.

Figure 9:
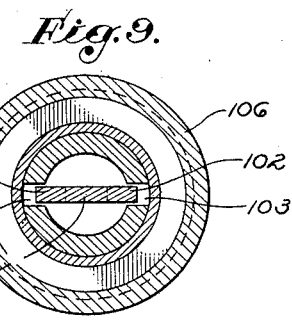

Fig. 9 is a sectional view taken on the line 9—9 of Fig. 1.

Fig. 10 is a diagrammatic view illustrating the motion reversing mechanism of my invention in one position.

Fig. 11 is a view similar to Fig. 10 but showing the reversing mechanism in another extreme position.

Fig. 12 is a fragmentary view illustrating another apparatus in which my invention has been incorporated.

Fig. 13 is a sectional view taken on the line 13—13 of Fig. 12.

Referring to the drawings in detail, and particularly to Figs. 1 to 9, inclusive, the form of my invention illustrated in these figures employs a shell having an upper part 20 and a lower part 21 which are adapted to be secured together by a threaded joint 22. The shell provides a chamber 23 through which fluid passes to the sprinkler unit or driven means adapted for reciprocatory movement and generally designated by the numeral 24. Positioned in the chamber 23 is a gear box consisting of a lower section 25, an intermediate section 26, and an upper section 27 which are secured together by screws 28. The lower section 25 has an outward extending flange 29 which is secured between gaskets 30 and which are gripped between a shoulder 31 of the lower part 21 of the shell and an end face 32 of the upper part of the shell. In this manner the gear box is secured in the chamber 23. It will be noted that the gear box is of smaller diameter or cross-sectional size than the chamber 23, as best illustrated in Fig. 4, and the flange 29 is provided with openings 34 to permit passage of water upward through the chamber 23 and around the gear box.

The lower section 25 is provided with a threaded projection 36 which threadedly receives a central bearing 37 adapted to rotatably support an impeller shaft 38. The impeller shaft 38 projects downward from the bearing 37 and has an impeller 39 threadedly secured thereto, this impeller 39 having blades 40 which extend in a downward direction. Positioned below the impeller 39 is an impeller plate 42 which is secured against a shoulder 43 by means of a sleeve 44 placed in the lower part 21 and in turn retained in place by means of the lower gasket 30. This impeller plate 42 has tangentially directed ports 45 formed therein which causes the water passing thereto to rotate or swirl. The rotating water engages the blades 40 of the impeller 39 and thus causes it to rotate.

The impeller shaft 38 is of reduced size above the bearing 37, as indicated at 48, and the upper end thereof is journalled in the lower wall 49 of the intermediate section 26. Secured to the shaft 48 is a gear 50 which is meshed with and engages a gear 51 which is rotatably mounted on a shaft 52. This shaft 52 is journalled at its lower end in the lower wall 53 of the lower section 25 and is journalled at its upper end in a removable journal plate 54 supported in a counterbore 55 provided by the upper section 27. Formed integrally with the gear 51 is a gear 56 which meshes with a gear 57 which is rotatably mounted on the shaft 48. Formed integrally with the gear 57 is a gear 59 which meshes with a gear 60 mounted on a shaft 61, the lower end of the shaft 61 being journalled in the lower wall 53 of the lower section 25, and the upper end thereof being journalled in the lower wall 49 of the intermediate section 26. Formed integrally with the gear 60 is a gear 63 which meshes with a gear 64 mounted on the shaft 48. Formed integrally with the gear 64 is a gear 65 which meshes with a gear 66 secured to the shaft 52. Formed integrally with the gear 66 is a driving gear 68 which is positioned in the chamber 69 provided by the intermediate section 26, the other gears just described all being situated in the chamber 70 of the lower section 25. As shown in Fig. 5, the drive gear 68 engages a driven gear 73 and an idler gear 74, which idler gear 74 meshes with a driven gear 75. The gears 73 and 75 are of identical size, shape, number of teeth, etc., and are driven in opposite directions and at the same rate of speed. These gears 73 and 75 are mounted on shafts 76 and 77, the lower ends of which are supported in the wall 49 and the upper ends of which are supported in the journal plate 54. This construction constitutes a fluid operated means of my invention.

Formed integrally with the driven gear 73 and positioned above it, is a primary reversing sector 78, and formed integrally and above the driven gear 75 is a secondary reversing sector 79. The primary and secondary reversing sectors 78 and 79 are located in the same plane and rotate in opposite directions as indicated by the arrows 80 and 81. The sectors are of identical construction, each including five teeth 82. Mounted on a shaft 84 is a reversing gear 85 so positioned that teeth 86 thereof will mesh and co-engage with the teeth 82 of the reversing sectors 78 and 79. The teeth of the reversing sectors are so arranged with respect to one another that one reversing sector engages and rotates the reversing gear 85 in one direction, and thereafter the other reversing sector engages and rotates the reversing gear 85 in the opposite direction. These parts constitute a motion reversing mechanism of my invention.

Positioned on the shaft 84 above the reversing gear 85 and preferably integral therewith as a gear 89 which is located in the chamber 90 provided by the upper section 27. This gear 89 meshes with a gear 91 which is secured to the lower end of a reversing member 92 which extends upwardly through a cylindrical bearing 93 of the upper section 27 to the exterior of the gear box. The gears 89 and 91 constitute a motion transmitting means, and by replacing these gears with others of different size the arc of rotation of the reversing member may be increased or decreased as desired. For example, by increasing the size of the gear 91 and decreasing the size of the gear 89, the arc of movement of the reversing member 92 is decreased. By increasing the size of the gear 89 and decreasing the size of the gear 91, the arc of movement of the reversing member 92 may be increased.

Connected to the upper end of the reversing member 92 is a universal joint 96 having a downwardly directed clevis 97 pivotally secured to the upper projecting end of the member 92 by means of a pin 98 and having an upward projecting slotted portion 99 which receives the lower end of an engagement member 100, which member is pivotally connected thereto by means of a pin 101. The upper end of the engagement member 100 is of T-formation having outward extending ends 102 which rest in slots 103 formed in the lower end of a sprinkler tube 105. These parts including the gears 89 and 91 constitute an interconnecting means of my invention.

The lower end of this tube 105 is supported in an outlet 106 of the shell by means of a nut 107 which is screwed into place and which has a shoulder 108 which surrounds an outward projecting flange 109 of the lower end of the sprinkler tube. Connected to the upper end of the sprinkler tube is a sprinkler head 110 which supports a sprinkler nozzle 111. When the reversing member 92 is moved back and forth, the interconnecting means causes the sprinkler unit to move back and forth through the same arc.

The apparatus referred to is installed in a sprinkler system preferably with a major portion thereof or all of it below the surface of the ground. If desired, the sprinkler unit may be of the projectable type; however, the projectable type has not been shown herein, since it is not a part of the present invention. The shell is connected to a riser pipe such as indicated by the numeral 115, which in turn is connected to a pipe, not shown, by means of which water is supplied to the chamber 23. As shown in Fig. 1, the lower section of the shell has a threaded inlet 116 into which the upper end of the riser pipe 115 is screwed, and in this manner water is introduced into the chamber 23. As pointed out heretofore, water passing upward through the chamber is caused to swirl in passing through the impeller plate 42, and this swirling water by engaging the impeller 39 causes it to rotate. Rotation of the impeller 39 causes a rotation of the shaft 38 and its reduced portion 48 with the result that the chain of gears in the chamber 70 of the lower part 25 is set into operation. The drive and driven relation is as follows. The gear 50 drives gear 51 which drives gear 56; gear 56 drives gear 57 which drives gear 59; gears 51 and 56 rotate on the shaft 52, while gears 57 and 59 rotate on the shaft 48; gear 59 rotates the gear 60 and gear 60 in turn rotates gear 63; gears 60 and 63 rotate on the shaft 61; gear 63 rotates gear 64 and gear 64 rotates gear 65; gears 64 and 65 rotate on shaft 48; gear 65 drives gear 66 and gear 66 drives gear 68; gears 66 and 68 are secured to the shaft 52 and rotate therewith.

As previously pointed out, the drive gear 68 drives the driven gear 73 and the idler gear 74 which idler gear in turn engages and drives the driven gear 75. These two gears 73 and 75 are driven at the same rate of speed and in opposite directions, as indicated by arrows in Fig. 5. Since the gears 73 and 75 are formed integrally with the primary and secondary reversing sectors 78 and 79, the reversing sectors are rotated therewith at the same rate of speed and in the directions indicated by the arrows 80 and 81.

As shown in Fig. 6, and also in Fig. 10, the primary reversing sector is just being disengaged from the reversing gear 85, and the secondary reversing sector is just coming into engagement with the reversing gear 85; while in Fig. 11 the primary reversing sector is just coming into engagement with the reversing gear 85 while the secondary reversing sector is just being moved out of engagement with the reversing gear 85. As illustrated in Figs. 6, 10, and 11, the two sectors 78 and 79 and the gear 85 are so designed and so positioned with relation to each other that as one sector comes into engagement with the reversing gear the other sector is just becoming disengaged, and vice versa. The parts are likewise so arranged that during the disengagement of one sector and the engagement of another sector the reversing gear 85 is always kept under control and is engaged so that it cannot be rotated into an improper position, and this prevents misalignment of any of the parts, the moving of the gear 85 and all parts driven thereby out of their proper synchronized positions, and any malmeshing or stalling of these parts.

It is one of the objects of my invention, which has been accomplished in the preferred forms illustrated herein, to provide the three gear members, that is, the two sectors and the reversing gear 85, which of themselves and without additional mechanism or parts, cause a proper reversing movement of the driven means or driven member and which at the same time in themselves prevent the parts from moving into improper or inoperative position by reason of the fact that one of the sectors is always in a position to control and determine the position of the reversing gear 85.

Referring particularly to Fig. 10, the axes of rotation of the two sectors and reversing gear are, in the form of my invention illustrated herein, arranged on center lines as shown. The axes of rotation of the primary reversing sector 78 and the reversing gear 85 are arranged on a center line or plane 120, and the axes of the secondary reversing sector 79 and the reversing gear 85 are on a center line 121. These center lines 120 and 121 are disposed with respect to each other at an angle of approximately 94°. Each sector 78 and 79 has five teeth, the centers of the two end teeth being spaced 130°—54′—32.72″.

The teeth are of 12 diametral pitch with eleven teeth, six of which have been removed, thus producing gear sectors having five teeth. The outside diameter is 1.084", the pitch diameter is .917", the root diameter is .7342", the depth of the teeth is .1798", and the addendum of each tooth is .0833" and the dedendum of each tooth .0964". The thickness of each tooth on the pitch line is .1309". The reversing gear has teeth of 12 diameter pitch and eight teeth on the gear. The outside diameter is .860", the pitch diameter is .716", and the root diameter is .523". The depth of each tooth is .1798", the addendum of each tooth is .0834", and the dedendum of each tooth is .0964". The thickness of each tooth on the pitch line is .1309".

With the sectors and gears 78, 79, and 85 of the size and in the positions specified above, upon the operation of the apparatus the primary reversing sector first rotates the reversing gear in one direction and the secondary reversing sector then rotates the reversing gear in the other direction. It will be seen in Fig. 10 that the last tooth 130 of the primary reversing sector 78 has just moved into a position to fully clear the reversing gear 85, and at the same time the first tooth 131 of the secondary reversing sector 79 is moved into a position between adjacent teeth 133 and 134 of the reversing gear, and therefore if any force were applied at this time to the reversing gear 85 tending to move it out of engagement with the tooth 131, it will be seen that this tooth 131 prevents such disengagement because it is at this time located between the teeth 133 and 134 and thus controls the position of the reversing gear 85. As the secondary reversing sector 79 comes into operation, the reversing gear 85 is rotated in a direction indicated by the arrow 136. The gear continues to move in this direction until the last tooth 137 of the secondary reversing sector 79 moves from engagement with the tooth of the reversing gear 85 with which it has been engaged and reaches a position shown in Fig. 11. At this time the first tooth 138 of the primary reversing sector has moved into a position between adjacent teeth 139 and 140 of the reversing gear 85 and thus controls the position of the reversing gear 85. It will be seen that any force exerted on the reversing gear 85 tending to rotate in either direction and out of proper alignment is ineffective, since the first tooth 138 rests between the teeth 139 and 140. As the parts continue to move, the primary reversing sector engages and rotates the reversing gear 85 in a direction indicated by the arrow 142 until such time that the parts reach the position as shown in Fig. 10.

Figure 2:
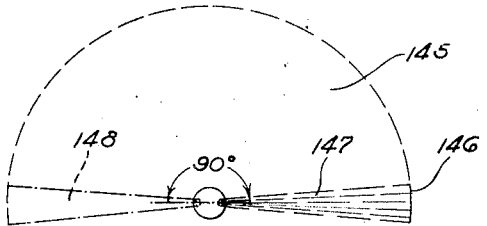
Fig. 2 is a diagrammatic plan view illustrating the arc through which the sprinkler nozzle or head is rotated and the manner in which the area to be irrigated is irrigated.

Since the reversing gear 85 is rotated first in one direction and then in the other direction, the gear 89 is likewise so moved. The gear 91 is in turn moved in the opposite direction, since it is engagement with the gear 89. This causes the reversing gear 91 to first move in one direction and then in the other. The connection to the sprinkler tube 105 in turn causes the sprinkler unit to first rotate in one direction and then in the opposite direction. With the gears 89 and 91 of the relative sizes shown, the sprinkler is rotated substantially 90°, as illustrated in Fig. 2, and the nozzle 111 irrigates a half circle area indicated by the numeral 145. As stated heretofore, the water which operates the impeller 40 passes upward around the gear box and through the opening of the sprinkler tube 105 reaching the nozzle 111, by means of which it is distributed in the form of a stream outward to the circumference 146 of the area to be irrigated. This stream of water is slowly moved from the position indicated at 147 in Fig. 2 into the position indicated by dotted lines 148, at which time the motion is reversed, and the stream of water is then moved to its original position. This action continues during the operation of the sprinkler.

The fluid operated, motion reversing mechanism of my invention is not limited to the sprinkler shown in Figs. 1 to 11, inclusive, but may be employed in other types of sprinklers. For example, it may be employed in the form of my invention shown in Figs. 12 and 13.

Referring to Figs. 12 and 13, the numeral 160 represents a supply pipe by means of which water or other fluid is supplied to the fluid operated, motion reversing mechanism indicated by the numeral 161 and which may be identical to that shown in Figs. 1 to 11. In view of the similarity of construction the details will not be shown in Fig. 12, since reference to the sectional views previously described may be had. The water supply pipe 160 corresponds to the pipe 15 shown in Fig. 1. Extending into the upper part 20 of the shell is a sprinkler pipe or member 162 which throughout its length is provided with sprinklers 163. This pipe 162 may be supported directly on the ground or may be provided with a series of bearing supports 164 as shown. The sprinkler pipe 162 is associated with the mechanism of my invention in the same manner that the sprinkler tube 105 is associated with it, and therefore the mechanism rotates the sprinkler pipe 162 through an angular movement indicated at 166 in Fig. 13, and, furthermore, water passing through the mechanism flows through the sprinkler pipe 162 and outward through the sprinklers as indicated by the numerals 167. It will be seen that by rotating the pipe, the sprays of water are first sent to the left as indicated at 170 and then to the right as indicated at 171, thus uniformly irrigating the area between the two limits on the opposite sides of the pipe.

As stated heretofore, my invention is not limited to the details of construction or design of parts illustrated herein. It is possible to substitute for the driven means, such as represented by the numeral 105 in Fig. 1 and the numeral 162 in Fig. 12, other means which it is desired to rotate in opposing directions. It is furthermore possible to provide other means for operating the reversing sectors 78 and 79 of my invention, and I therefore do not wish to be limited to the details of construction or design of the gear arrangement which I have illustrated herein. I recognize that those skilled in the art may make various alterations and modifications of my invention without, however, departing from the spirit and scope thereof, and I therefore desire my invention to be interpreted and construed to be of the scope of the appended claims.

I claim as my invention:

1. In sprinkling apparatus having a sprinkler unit adapted for reciprocatory movement, a shell to which said sprinkler is connected so as to receive fluid therefrom, and fluid operated means adapted to be continuously operated during the time fluid is passing through said shell, the combination of: motion reversing mechanism in said shell operated by said fluid operated means, said mechanism including two gear sectors each having the same number of teeth connected to be driven by said fluid operated means in opposite directions, a reversing gear positioned to be engaged by one gear sector and rotated in one direction and then to be engaged by the other gear sector and rotated in the other direction, said gear sectors and said reversing gear being arranged so that as the last tooth of one sector moves from engagement with said reversing gear the first tooth of the other sector moves into engagement with said reversing gear and so that a plane through the axis of one of said gear sectors and the axis of said reversing gear and a plane through the axis of the other of said gear sectors and the axis of said reversing gear are at an angle of approximately 94°; and interconnecting means between said reversing gear of said motion reversing means and said sprinkler unit for moving same first in one direction and then in the opposite direction alternately during the time fluid is flowing through said sprinkler unit.

2. In sprinkling apparatus having a sprinkler unit adapted for reciprocatory movement, a shell to which said sprinkler is connected so as to receive fluid therefrom, and fluid operated means adapted to be continuously operated during the time fluid is passing through said shell, the combination of: motion reversing mechanism in said shell operated by said fluid operated means, said mechanism including two gear sectors connected to be driven by said fluid operated means in opposite directions, a reversing gear positioned to be engaged and rotated by one gear sector in one direction and then to be engaged by the other gear sector and rotated in the other direction, said gear sectors each having five teeth occupying but a part of the circumference thereof, and said reversing gear having eight teeth, and said gear sectors and said reversing gear being arranged so that as the last tooth of one sector moves from engagement with said reversing gear the first tooth of the other sector moves into engagement with said reversing gear and so that a plane through the axis of one of said gear sectors and the axis of said reversing gear and a plane through the axis of the other of said gear sectors and the axis of said reversing gear are at an angle of approximately 94°; and interconnecting means between said reversing gear of said motion reversing means and said sprinkler unit for moving same first in one direction and then in the opposite direction alternately during the time fluid is flowing through said sprinkler unit.

3. In sprinkling apparatus having a sprinkler unit adapted for reciprocatory movement, a shell to which said sprinkler is connected so as to receive fluid therefrom, and fluid operated means adapted to be continuously operated during the time fluid is passing through said shell, the combination of: motion reversing mechanism in said shell operated by said fluid operated means, said mechanism including two gear sectors connected to be driven by said fluid operated means in opposite directions, a reversing gear positioned to be engaged and rotated by one gear sector in one direction and then to be engaged by the other gear sector and rotated in the other direction, said gear sectors each having five teeth occupying but a part of the circumference thereof, and said reversing gear having eight teeth, and said gear sectors and said reversing gear being so arranged that as the last tooth of one of said gear sectors moves from engagement with said reversing gear, the first tooth of the other of said gear sectors moves into a position to control said reversing gear.

4. In sprinkling apparatus having a sprinkler unit adapted for reciprocatory movement, a shell to which said sprinkler is connected so as to receive fluid therefrom, and fluid operated means adapted to be continuously operated during the time fluid is passing through said shell, the combination of: motion reversing mechanism in said shell operated by said fluid operated means, said mechanism including two gear sectors connected to be driven by said fluid operated means in opposite directions, each of said gear sectors having the same number of teeth, and a reversing gear positioned to be engaged by one gear sector and rotated in one direction and then to be engaged by the other gear sector and rotated in the other direction, said gear sectors and said reversing gear being so arranged that as the last tooth of one of said gear sectors moves from engagement with said reversing gear, the first tooth of the other of said gear sectors moves into a position to control said reversing gear; and interconnecting means between said reversing gear of said motion reversing means and said sprinkler unit for moving same first in one direction and then in the opposite direction alternately during the time fluid is flowing through said sprinkler unit.

WALTER VAN E. THOMPSON.